United States Patent
Sharma et al.

(10) Patent No.: US 12,329,160 B2
(45) Date of Patent: Jun. 17, 2025

(54) ACTIVATED FERRATE COMPOSITIONS

(71) Applicants: THE TEXAS A & M UNIVERSITY SYSTEM, College Station, TX (US); DEPARTMENT OF VETERANS AFFAIRS, Washington, DC (US)

(72) Inventors: Virender Sharma, College Station, TX (US); Chetan Jinadatha, Washington, DC (US)

(73) Assignees: THE TEXAS A & M UNIVERSITY SYSTEM, College Station, TX (US); DEPARTMENT OF VETERANS AFFAIRS, Washington, DC (US)

( * ) Notice: Subject to any disclaimer, the term of this patent is extended or adjusted under 35 U.S.C. 154(b) by 0 days.

(21) Appl. No.: 16/981,615

(22) PCT Filed: Mar. 15, 2019

(86) PCT No.: PCT/US2019/022562
§ 371 (c)(1),
(2) Date: Sep. 16, 2020

(87) PCT Pub. No.: WO2019/178529
PCT Pub. Date: Sep. 19, 2019

(65) Prior Publication Data
US 2021/0030008 A1 Feb. 4, 2021

Related U.S. Application Data

(60) Provisional application No. 62/644,274, filed on Mar. 16, 2018.

(51) Int. Cl.
*A01N 59/16* (2006.01)
*A01N 25/04* (2006.01)
*A01N 25/30* (2006.01)

(52) U.S. Cl.
CPC ............. *A01N 59/16* (2013.01); *A01N 25/04* (2013.01); *A01N 25/30* (2013.01)

(58) Field of Classification Search
CPC .......... A01N 59/16; A01N 25/04; A01N 25/30
See application file for complete search history.

(56) References Cited

U.S. PATENT DOCUMENTS

| | | | |
|---|---|---|---|
| 2002/0155044 A1 | 10/2002 | Ciampi et al. | |
| 2011/0023913 A1 | 2/2011 | Fulling | |
| 2011/0076223 A1 | 3/2011 | Sharma | |
| 2011/0268672 A1 | 11/2011 | Monzyk et al. | |
| 2020/0085063 A1* | 3/2020 | Sharma | C11D 7/10 |

FOREIGN PATENT DOCUMENTS

| | | | |
|---|---|---|---|
| CN | 104370390 | * | 2/2015 |
| CN | 104370390 A | * | 2/2015 |
| CN | 107509743 | * | 12/2017 |
| CN | 107509743 A | | 12/2017 |
| WO | WO 9221617 | * | 12/1992 |
| WO | 2003050043 A2 | | 6/2003 |

OTHER PUBLICATIONS

Sodium hypochlorite—Molecule of the month Oct. 2011, pp. 1-3. (Year: 2011).*
Jiang et al (Effect of different solutes, natural organic matter, and particulate Fe(II) on ferrate(VI) decomposition in aqueous solutions), ACS publications, pp. 2841-2848. (Year: 2015).*
MacQuarrie et al (The ins and outs of dichlorination), Nuts and Bolts, Hatchery International, pp. 26-28. (Year: 2002).*
Deng et al (Ferrate(VI) decomposition in water in the absence and presence of natural organic matter (NOM)), Chemical Engineering Journal 334 (218) 2335-2342. Available online Dec. 5, 2017. (Year: 2018).*
International Search Report and Written Opinion, mailed May 28, 2019, for International Patent Application No. PCT/US2019/68507, 16 pages.

\* cited by examiner

*Primary Examiner* — Mina Haghighatian
(74) *Attorney, Agent, or Firm* — Barnes & Thornburg LLP

(57) ABSTRACT

Aqueous activated ferrate solutions, methods of their preparation, and methods of disinfecting organisms and oxidizing pollutants in water are provided.

21 Claims, 11 Drawing Sheets

ACTIVATED FERRATE COMPOSITIONS

CROSS-REFERENCE TO RELATED APPLICATION

This application claims the benefit of Provisional Application No. 62/644,274 filed Mar. 16, 2018, which is expressly incorporated herein by reference in its entirety.

FIELD OF THE INVENTION

Compositions and method of preparing and using activated ferrate solution to accelerate and enhance oxidation capacity for disinfecting and purifying water.

BACKGROUND OF THE INVENTION

One of the major issues of this century is to provide clean water to humans. The United Nations and World Health Organization (WHO) have reported that more than 2 billion humans face, some kind of risk associated with unsafe drinking water at home. Water pollutants usually contains diseases-causing agents (e.g., protozoa, virus, and bacteria), toxic metals (e.g. arsenic and lead), nutrients (e.g., nitrate and phosphate), and organic pollutants (e.g., surfactants, dyes, and pesticides). Other recent concerns include endocrine disruptor chemicals (EDCs), pharmaceuticals, and personal care products (PPCPs). Contaminants present in industrial, agricultural, and consumer products also enter drinking water resources (e.g. surface, groundwater and surface water). Below are some examples of contamination related issues that the human society is currently encountering.

Diarrheal illness related to consumption of drinking water is a major cause of morbidity and mortality across the world. Nearly 1.7 billion cases of diarrhea occur in children each year. Diarrheal illness is the second leading cause of death among children less than five years old accounting for 525,000 deaths per year. Majority of the diarrheal illness are preventable through safe drinking water, adequate sanitation, and hygiene. Diarrheal illness is the leading cause of severe malnutrition among children less than five years old. In developing countries, there is lack of access to safe and clean drinking water. It is estimated that about 780 million people in developing countries lack access to safe water. Diarrhea is usually caused by a host of organisms: bacteria, viruses and parasitic organisms being the most important. The organisms usually enter the drinking water because of contamination by feces by humans or animals. Rotavirus and *Escherichia coli* are the two most common causes of moderate to severe diarrheal illness in developing countries. Other important organisms are *cryptosporidium* and *Shigella* species. During times of hurricanes and other natural disasters along with *E. coli, Vibrio Cholera* causes massive outbreaks of diarrheal illness. In war displaced refugees camps, diarrheal illness causes major apprehensions to authorities trying to help camp residents. Campers, soldiers on patrol, and residents in developed countries during water main breaks or during natural disasters and power outages need access to clean water on demand. Current solutions that exist for such scenarios include chlorine or iodide tablets. The disadvantages of these include high cost, bad taste and take many minutes (35-45) to hours for disinfection. Another disadvantage is these processes do not remove other dissolved particles, heavy metals and chemicals. Another solution is filtration, but that sometimes is unreliable, expensive and takes time to filter particles and bacteria.

Recent events, such as the events in Flint, Michigan, where the potable water system for the entire city was contaminated with high levels of lead which is considered toxic to humans especially developing children further highlight the lack clean reliable drinking water systems even in developed countries such as United States. Similarly, high levels of arsenic in ground water, is another issue in many developing countries. Chemicals, pollutants that contain carcinogens, and other antibiotic containing waste gets discharged directly in river without any treatment only to be reused downstream by the next municipality. Even if treated for bacteria, such pollutants don't get either filtered or removed.

Another issue is release of untreated water from ballasts of ships or from sewer plants into rivers, lakes and the sea. This leads to diarrheal illness and destruction of flora and the fauna in the rivers and lakes.

There needs to be a comprehensive system that disinfects and purifies the water before consumption or before discharge.

In recent years, tetraoxy iron in +6 oxidation state ($Fe^{VI}O_4^{2-}$), commonly called "ferrate", has been shown to be potentially effective disinfectant, oxidant, and coagulant for treating water and wastewater. Ferrate reduces to Fe(III), forming no harmful byproducts, and is, therefore, an environmentally friendly compound compared to the unpleasant and harmful by-products formed from conventional chemicals (e.g., chlorine).

Ferrate has ability to inactivate a wide range of microorganisms (e.g., *Escherichia coli, Staphylococcus aureus, Shigella flexneri*, and *Salmonella typhimurium*) at very low concentrations in water. Ferrate has also shown effectiveness in oxidation of low levels of inorganic and organic contaminants. Ferrate has also demonstrated its capability to remove low levels of phosphate and toxic metals.

Though ferrate inactivates microorganisms effectively, the Ct values (where C is concentration of a ferrate and t is the contact time with the water being disinfected) are high. This is due to the duration of contact time being high, resulting in high values of t, which are in minutes (or hours). In good practice of disinfection, a value of t should be low to achieve required disinfection of water (or inactivation of microorganisms) in a shorter period of time.

In addition, ferrate can oxidize a large number of organic contaminants; however, some of the compounds have shown recalcitrant towards ferrate. These recalcitrant contaminants in water takes a long time to oxidize and their removal in water are incomplete. In summary, the current ferrate technology has 3 main issues: duration of disinfection and oxidation is too long, majority of the studies and data have been demonstrated in controlled setting of a buffer which is not practical for real application and the disinfection and oxidation has been established at very low concentration of organisms and contaminants, all of which may not be practical for real world application. The invention herein solves these problems by providing a novel activated ferrate solution that can obtain disinfection and oxidation in seconds with real world application potential.

SUMMARY OF THE INVENTION

The invention is compositions and methods to accomplish high oxidation capacity, disinfection and oxidation of recalcitrant organic contaminants in water or liquid at a much shorter time scale than previously reported and outside of controlled setting of buffer. This is a discovery which could not be envisioned by many researchers who are investigating ferrate for many decades. Moreover, this discovery is contrary to what researchers have suggested.

In one aspect, the present application provides an activated ferrate solution. In some embodiments, the activated ferrate solution comprises:
(a) water;
(b) one or more cations selected from cations of alkali metals, cations of alkali earth metals, ammonium ions, and combinations thereof;
(c) one or more activating agents; and
(d) ferrate.

In certain embodiments, the concentration of ferrate is between about 0.001 wt % and about 5.0 wt %. Any type of water can be used for preparation of the activated ferrate solutions disclosed herein: undistilled, potable, non-potable, non-deionized, tap, distilled, deionized, or DDI water. In some embodiments, the activating agent is an anion selected from bicarbonate, thiosulfate, or sulfite. In certain embodiments, the activating agent is an organic acid, for example, a carboxylic acid. Any carboxylic acid suitable for the preparation of the activated ferrate solutions can be used. In some embodiments, the organic acid is acetic acid, formic acid, citric acid, ascorbic acid, or combinations thereof.

In some embodiments, the activated ferrate further comprises a disinfectant selected from sodium hypochlorite, chloramine, quaternary alkylamines, and combinations thereof. In some instances, the disinfectant is sodium hypochlorite present in a concentration of between about 0.001 wt % and about 5.0 wt %. The activated ferrate solutions can further comprise one or more surfactants.

In some embodiments, the activated ferrate solution has a pH between about 5.0 and about 12, between about 7.0 and about 12, or between about 8.0 and about 10. In some embodiments, the activated ferrate solution is stable and has a pH between about 8.0 and about 10.5, making it suitable for use as common surface disinfectant. Typically, the activated ferrate solutions disclosed herein are stable for a period of at least 1 hour, at least 2 hours, at least 3 hours, at least 4 hours, at least 5 hours, at least 10 hours, at least 15 hours, at least 24 hours, at least 1 day, at least 2 days, or at least a week.

In a second aspect, a method for disinfecting a surface, which addresses the problems associated with currently used surface disinfectants, is provided. In certain embodiments, the method comprises contacting the surface with the activated ferrate solutions provided herein, thereby disinfecting the surface.

In a third aspect, provided herein are methods for making the activated ferrate solutions. In some embodiments, these methods include the steps of (a) heating an iron-containing material selected from iron oxides, iron salts, and combinations thereof in the presence of potassium nitrate, thereby obtaining an iron-containing solid intermediate; and (b) adding the iron-containing solid intermediate to an aqueous solution comprising one or more activating agents, to provide an activated ferrate solution.

In some embodiments, the solid intermediate is added to the water or liquid to be decontaminated after the addition of an activating agent to the water or liquid to be decontaminated.

In a fourth aspect, disclosed herein is a method of removing contaminants from contaminated water comprising contacting contaminated water with the activated ferrate solution disclosed herein for oxidation and disinfection.

Additionally, disclosed herein is a method for rapid removal of recalcitrant contaminants from contaminated water, comprising contacting contaminated water with the activated ferrate solutions provided herein.

Figure 1B:
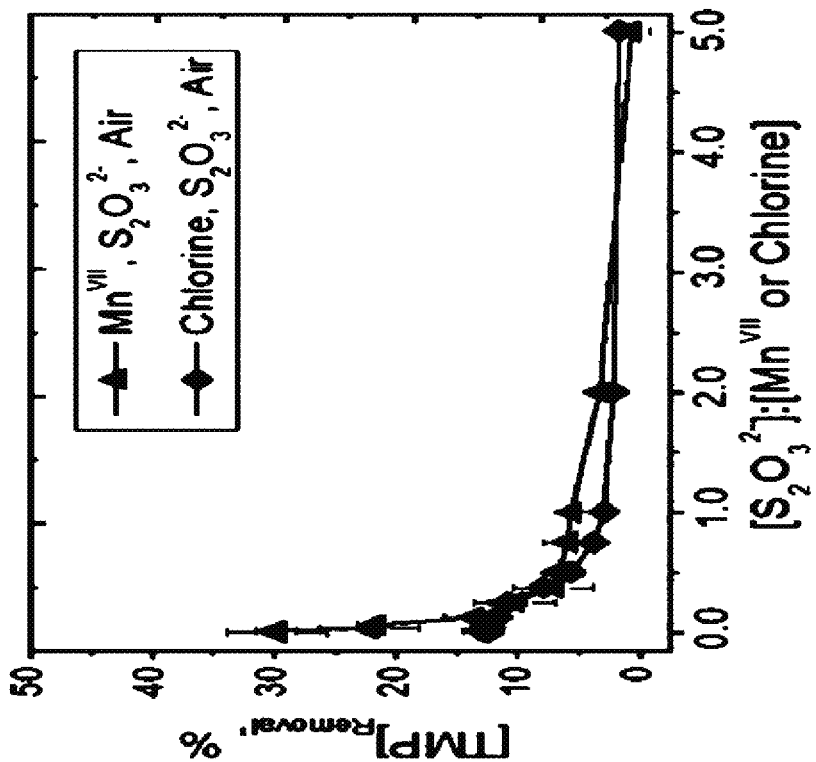
FIGS. 1A and 1B demonstrate oxidation of trimethoprim (TMP) by $Fe^{VI}$—$S_2O_3^{2-}$ in water (1A), and by $Mn^{VII}$—$S_2O_3^{2-}$ and chlorine-$S_2O_3^{2-}$(1B).

$[TMP]_0$=5.0 μM, $[Fe^{VI}]_0$=100.0 μM; $[S_2O_3^{2-}]_0$=12.5 μM; $[DMSO]_0$=1.0 mM; pH=8.00±0.05, reaction time=30 s.

DETAILED DESCRIPTION OF THE INVENTION

The present disclosure is directed to activated ferrate solutions and methods of their preparation and use. The inventors have discovered that a ferrate solution that is prepared by adding an iron-containing ferrate intermediate to water comprising one or more anions (e.g., anions commonly present in tap water), one or more cations (e.g., cations commonly present in tap water), and one or more carboxylic acids results in an activated ferrate solution that is an effective surface disinfectant. Accordingly, in one aspect, the present application provides an activated ferrate solution comprising:

(a) water;
(b) one or more cations selected from cations of alkali metals, cations of alkali earth metals, ammonium ions, and combinations thereof;
(c) one or more activating agents; and
(d) ferrate.

As used herein, "ferrate", also referred to interchangeably as $Fe^{VI}O_4^{2-}$, "$Fe(VI)O_4^{2-}$", and "ferrate(VI)," refers to tetraoxy iron in +6 oxidation state with the chemical formula $[FeO_4]^{2-}$ or a material comprising an oxycompound of iron in an oxidation state of six.

In certain embodiments, the activated ferrate solutions have a concentration of ferrate from about 0.001 wt % to about 1.0 wt %. As used herein, the term "about" refers to +/−5% of the recited value. In certain embodiments, the activated ferrate solutions have a concentration of $Fe^{VI}O_4^{2-}$ or ferrate of about 5.0 wt %.

In certain embodiments, the water is undistilled, non-deionized, tap, distilled, deionized, or DDI water. Potable or non-potable water can be used to prepare the activated ferrate solutions disclosed herein. Regular tap water, e.g., water that has not been distilled or deionized, can be used in preparation of the activated ferrate solutions provided herein, reducing the costs of preparation of the activated ferrate solutions. Alternatively, distilled or deionized water with the addition of one or more actions and one or more anions can be used.

In some instances, the one or more activating agents comprise an anion. The anions suitable for the inclusion in the activated ferrate solutions provided herein comprise carbonate, sulfate ions, and combinations thereof. The cations comprise cations of alkali metals, cations of alkali earth metals, ammonium ions, and combinations thereof.

In some embodiments, the concentration of the one or more cations is from about 0.0001 M to about 0.025 M. In certain embodiments, the concentration of the one or more anions is between from 0.0001 M to about 1.0 M.

In some embodiments, the one or more activating agents is an organic acids such as a carboxylic acid. Suitable carboxylic acids are selected from acetic acid, formic acid, citric acid, ascorbic acid, and combinations thereof.

In some embodiments, the activating agent is a carbonate, bicarbonate, thiosulfate, or sulfite. In some embodiments, the activating agent for ferrate is a carbonate. Suitable carbonates are selected from but not limited to sodium bicarbonate, potassium bicarbonate, and calcium bicarbonate. In other embodiments, the activating agent is thiosulfate.

In some embodiments, the concentration of the one or more activating agents, e.g., carbonates, is from about 0.0001 Millimolar to about 2 Millimolar. In certain embodiments, the concentration of the one or more anions is from about 0.0001 Millimolar to about 2 Millimolar.

Surprisingly, the activated ferrate solutions provided herein have a pH from about 8.0 to about 10.5 and are stable within this pH range, making them suitable for common disinfecting purposes. In some embodiments, the solutions can further comprise a disinfectant selected from sodium hypochlorite, chloramine, quaternary alkylamines, and combinations thereof. For example the disinfectant can be sodium hypochlorite present in the activated ferrate solution at a concentration of between about 0.001 wt % and about 1.0 wt %. Additionally, the activated ferrate solutions provided herein can further comprise one or more surfactants.

The activated ferrate solutions provided herein are stable for a period of at least 1 hour, at least 2 hours, at least 3 hours, at least 4 hours, at least 5 hours, at least 10 hours, at least 15 hours, at least 24 hours, at least 1 day, at least 2 days, or at least a week.

In certain embodiments, the activated ferrate solutions provided herein are activated, meaning that they are effective at disinfecting a surface.

Accordingly, in a second aspect, the present application provides methods of disinfecting a surface, comprising contacting a surface with an activated ferrate solution disclosed herein.

A used herein, disinfecting the surface comprises killing, destroying, inactivating, or otherwise disabling a microorganism such as a bacteria or a virus. As used herein, disinfecting includes killing, inactivating, or otherwise rendering microorganisms incapable of reproducing and/or infecting a host organism, such as a human.

In certain embodiments, disinfecting includes killing one to 100 million organisms. In certain embodiments, the present methods are capable of disinfecting surfaces contaminated with about $1*10^1$ microorganisms/cm$^2$ to about $1*10^8$ microorganisms/cm$^2$. Microorganisms that can be killed or otherwise rendered incapable of reproducing and/or infecting a host organism include bacteria, viruses, fungi, archaea, protozoa, and algae. Representative microorganisms suitable for being disinfected by the methods disclosed herein include *Escherichia coli, Staphylococcus aureus, Shigella flexneri, Salmonella typhimurium, Clostridium difficile* bacteria and spores, Rhinovirus, Norovirus, Zika virus, Ebola virus, *Aspergillus*, amoeba, helminthic eggs, and *Histoplasma*.

In certain embodiments, disinfecting the surface comprises killing, destroying, or otherwise rendering microorganisms incapable of reproducing and/or infecting a host organism, wherein the microorganism is an antibiotic-resistant microorganism. In certain embodiments, the antibiotic-resistant microorganism is methicillin-resistant *Staphylococcus aureus* (MRSA).

In certain embodiments, disinfecting the surface reduces the iron in $Fe^{VI}O_4^{2-}$ from Fe(VI) to Fe(III) or Fe(II). In certain embodiments, the by-products of disinfecting reactions between activated ferrate and microorganisms are non-toxic or otherwise harmless by-products, such as Fe(III).

As noted above, the methods provided herein are useful in disinfecting surfaces. Surfaces that can be disinfected include any surface having microorganisms that needs disinfection. Such surfaces include, without limitation, surfaces in homes, schools, hotels, vehicles, offices, businesses, parks, bathrooms, and the like. In certain embodiments, the surfaces are healthcare surfaces present in, for example, hospitals, nursing homes, hospices, outpatient facilities, dentists' offices, pharmacies, and the like. In certain embodiments, the health care surface is selected from a surface of a hospital bed, a hospital floor, non-sterilizable medical equipment, and a tray table.

In certain embodiments, the surface to be disinfected is porous. In certain embodiments, the surface to be disinfected is woven. In certain embodiments, the surface comprises a material selected from glass, ceramic, metal, wall paper, painted walls, and plastic.

In a third aspect, the present application provides methods of preparing an activated ferrate solution, such as disinfectant solution for disinfecting a surface comprising:

(a) heating an iron-containing material selected from iron oxides, iron salts, and combinations thereof in the presence of potassium nitrate, thereby obtaining an iron-containing solid intermediate; and (b) adding the iron-containing solid intermediate to an aqueous solution comprising one or more activating agents to provide a activated ferrate solution.

In certain embodiments, the activated ferrate solution is prepared by dissolving the iron-containing solid in water comprising one or more cations selected from cations of alkali metals, cations of alkali earth metals, ammonium ions, and combinations thereof; one or more anions selected from thiosulfate, carbonate, and sulfate ions; and/or one or more organic acids, intermediate immediately prior to its use as a disinfectant. In other embodiments, the solution can be stored for a period of at least 1 hour, at least 2 hours, at least 3 hours, at least 4 hours, at least 5 hours, at least 10 hours, at least 15 hours, at least 24 hours, at least 1 day, at least 2 days, or at least a week, prior to use.

In some embodiments, the activated ferrate solution comprises ferrate or $Fe^{VI}O_4^{2-}$ in a concentration from 0.001 wt % to about 5.0 wt %. In certain embodiments, the Fe(VI) $O_4^{2-}$ has a concentration of about 0.25%. In some embodiments, the concentration of the one or more cations in the activated ferrate solution is from about 0.0001 M and to 1.0 M. In certain embodiments, the concentration of the one or more anions is from about 0.0001 M to about 1.0 M.

In some embodiments, the one or more organic acids is a carboxylic acid. Carboxylic acids suitable for the preparation of the activated ferrate solutions disclosed herein include acetic acid, formic acid, citric acid, ascorbic acid, and combinations thereof.

In certain embodiments, the disinfectant solution further comprises an additional disinfecting agent, for example, sodium hypochlorite. Sodium hypochlorite is useful in helping to further disinfect surfaces in synergy with ferrate. In certain embodiments, the disinfecting agent, e.g., sodium hypochlorite, has a concentration from about 0.001 wt % to about 1.0 wt %.

In certain embodiments, the disinfectant solution has a pH from about 5.0 to about 13.0. Preferably, the solutions used in the disinfecting methods disclosed herein have a pH of from about 8.0 to about 10.5.

In certain embodiments, the activated ferrate solution comprises one or more surfactants. Such surfactants are useful in cleaning surfaces that are also disinfected by the disinfectant solution.

In certain embodiments, the activated ferrate solution is an aqueous solution. The activated ferrate solution can be prepared from distilled water, un-distilled water, tap water, potable water, non-potable water, and the like. In some embodiments, the activated ferrate solution is prepared by adding the iron-containing solid intermediate described above to tap water or river water, or lake water or seawater comprising one or more activating agents. In some embodiments, the activating agent is added to the water to be decontaminated followed by the addition of the solid intermediate described above.

In a fourth aspect, provided herein are methods of removing contaminants in water, comprising contacting contaminated water with the activated ferrate solution disclosed herein.

A used herein, contaminated water comprises wastewater, polluted water, and any water containing organic contaminants such as artificial sweeteners, pesticides, pharmaceuticals, and X-ray contrast medium. As used herein, removal of contaminants comprises the chemical removal of organic contaminants by oxidation.

In a fifth aspect, the present disclosure provides methods of removing recalcitrant contaminants in water, comprising contacting contaminated water with the activated ferrate solution disclosed herein.

As used herein, recalcitrant contaminants are contaminants which have shown low oxidative reactivity with $Fe^{VI}$ and show incomplete removal from water despite increasing treatment time for removal, or increasing concentrations of non-activated ferrate solutions.

In certain embodiments, the ferrate solution comprises one or more fragrance compounds for providing a fragrance, e.g., to disinfected surfaces.

EXAMPLES

Preparation of Liquid Activated Ferrate Solution

Activated ferrate was prepared by two approaches: (i) Solid ferrate intermediate was added directly added into tap water in which one or more activating agents, e.g., ions, were present creating the required conditions to activate ferrate, and (ii) Solid potassium ferrate(VI) was added into the mixture containing ferrate and target pollutant that generated in situ activated ferrate solution.

Activated Ferrate Comprising Thiosulfate

The objectives of the experiment were: (i) demonstrate the enhanced reactivity of Fe(VI) by combining it with $S_2O_3^{2-}$ for decontaminating organic pollutants in water. Sixteen organic contaminants/micropollutants were selected, which belonged to different categories (artificial sweetener, pesticides, pharmaceuticals, and X-ray contrast medium, as shown in Table 1), which have shown low reactivity with FeVI alone, (ii) exhibit tuned reactivity of FeVI to remediate rapidly the organic contamination in real water matrices (river and lake water); and (iii) elucidate reactive species that may be involved in accelerating the oxidation of pollutants in the FeVI-$S_2O_3^{2-}$ system.

To test liquid ferrate solutions using second approach, batch experiments were conducted in a series of 100 mL glass jars under constant stirring rate (400 rpm) with a magnetic stirrer. Oxidation of each micropollutant or their mixtures by $Fe^{VI}$ with or without $S_2O_3^{2-}$ was initiated by mixing equal solution volumes of 10 mL, and the final reaction solutions were kept at 8.00±0.04. The concentration of $Fe^{VI}$ was maintained at 100.0 μM, and the ratios of $[S_2O_3^{2-}]$:$[Fe^{VI}]$ in the system were varied from 0 to 5.0 for aqueous removal of a target pollutant (e.g., trimethoprim, TMP (5.0 μM). The optimized ratio of $[S_2O_3^{2-}]$:$[Fe^{VI}]$ at 1:8 (i.e., 0.125) was applied for oxidizing different pollutants in ultrapure water or real water samples (river water and lake water). After 30 s of oxidation, 20 μL hydroxylamine ($NH_2OH$ solution, 1 M) was added to quench the reactions. Samples were transferred into HPLC vials and were subsequently analyzed using high performance liquid chromatography method.

Test Pollutant Preparation

Sixteen test contaminants of high purity (>98%), $Na_2S_2O_3$ and the buffer chemicals ($Na_2HPO_4$ and $Na_2B_4O_7 \cdot 10H_2O$) were used in testing. The abbreviations, chemical structures and categories of these organic contaminants are shown in Table 1.

TABLE 1

Chemical structures of sixteen test organic contaminants in this study.

| Chemicals | Abbr. | Category | Molecular structure |
|---|---|---|---|
| Aspartame | APT | Artificial sweetener | |
| Atenolol | ATL | Beta-blocker | |
| Atrazine | ATZ | Herbicide | |
| Bezafibrate | BZF | Antilipemic agent | |
| Caffeine | CAF | Psychoactive drug | |
| Carbamazepine | CMZ | Anticonvulsant | |

TABLE 1-continued

Chemical structures of sixteen test organic contaminants in this study.

| Chemicals | Abbr. | Category | Molecular structure |
| --- | --- | --- | --- |
| Dexamethasone | DMS | Corticosteroid medication | 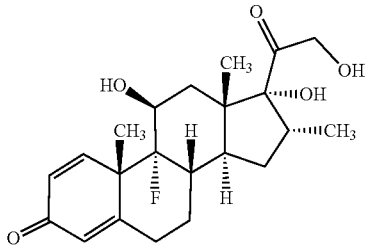 |
| Diatrizoic acid | DTA | X-ray contrast medium | 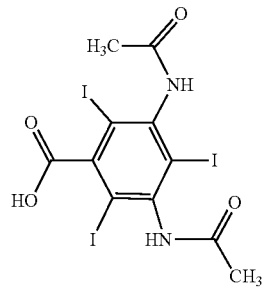 [SMILES: CC(=O)Nc1c(I)c(NC(C)=O)c(I)c(C(=O)O)c1I] |
| Diclofenac | DCF | Nonsteroidal anti-inflammatory drug | 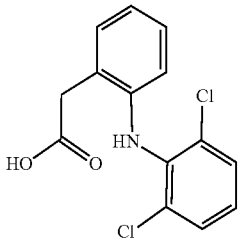 [SMILES: O=C(O)Cc1ccccc1Nc1c(Cl)cccc1Cl] |
| Enrofloxacin | ENR | Fluoroquinolone antibiotic | 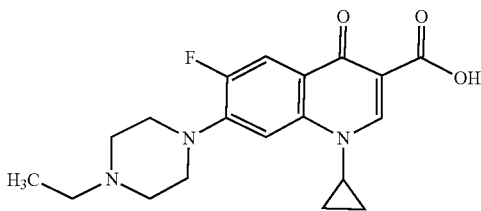 [SMILES: CCN1CCN(c2cc3c(cc2F)c(=O)c(C(=O)O)cn3C2CC2)CC1] |
| Flumequine | FLU | Fluoroquinolone antibiotic | 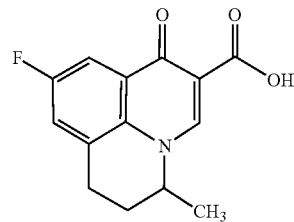 [SMILES: CC1CCc2cc(F)cc3c(=O)c(C(=O)O)cn1c23] |
| Ibuprofen | IBP | Nonsteroidal anti-inflammatory drug | 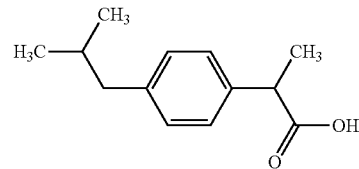 |

TABLE 1-continued

Chemical structures of sixteen test organic contaminants in this study.

| Chemicals | Abbr. | Category | Molecular structure |
|---|---|---|---|
| N,N-diethyl-3-toluamide | DEET | Insect repellent | |
| Propranolol | PPN | Beta-blocker | |
| Sulfadimethoxine | SMX | Sulfonamide antibiotic | |
| Trimethoprim | TMP | Antibacterial drug | |

The stock solutions of these contaminants (10.0 µM) were prepared in 10.0 mM $Na_2HPO_4$, and diluted using the same buffer solution before the removal experiments. Potassium ferrate ($K_2FeO_4$, purity >90%) was prepared using a wet chemical synthesis method. Solutions of $Fe^{VI}$ were prepared by adding $K_2FeO_4$ powders to 5.0 mM $Na_2HPO_4$/1.0 mM $Na_2B_4O_7 \cdot 10H_2O$ buffer solution. The concentrations of $Fe^{VI}$ were quantitatively measured using an UV-visible spectrometer at a wavelength of 510 nm with a molar absorption coefficient of $\varepsilon_{510\ nm}$=1150 $M^{-1}$ $cm^{-1}$. The pH value of the contaminant solutions was adjusted to 7.50 via the addition of diluted $H_3PO_4$ before mixing with $Fe^{VI}$ solution to achieve the desired reaction pH at 8.00±0.04. Methanol and phosphoric acid (85%) of high performance liquid chromatography (HPLC) grade were used in testing. 5,5-dimethyl-1-pyrroline-N-oxide (DMPO) was used as the spin trap reagent for identifying the possible reactive inorganic radicals (e.g., $\cdot OH$ and/or $SO_4 \cdot^-$) in the oxidation system. All the other chemicals (e.g., hydroxylamine and permanganate) were provided from commercial sources and used without further purification. Two kinds of natural water samples were individually obtained from Brazos River (N 30°42'33", E 96°28'5", College Station, Texas) and Lake Bryan (N 30°33'30", E 96°25'25", Bryan, Texas). No test contaminants were detected in these waters, and the basic physico-chemical parameters are pH, 8.36, $UV_{254}$, 0.071 and $UV_{400}$, 0.006 for river water; and pH, 9.43, $UV_{254}$, 0.202, and $UV_{400}$, 0.017 for lake water. These real water samples were filtered through 0.45 µm hydrophilic PVDF membrane to remove the insoluble particles before spiking the contaminant mixtures (1.0 µM for each compound). 20.0 mM borate buffer was used to stabilize the solution pH of the real waters at 8.00±0.04. All the other solutions were prepared using the ultrapure water (resistivity >18 MΩ $cm^{-1}$).

Testing

Experiments were conducted in a series of 100 mL glass jars under constant stirring rate (400 rpm) with a magnetic stirrer. Oxidation of each contaminant or their mixtures by $Fe^{VI}$ with or without $S_2O_3^{2-}$ was initiated by mixing equal solution volumes of 10 mL, and the final reaction solutions were kept at 8.00±0.04. The concentration of $Fe^{VI}$ was maintained at 100.0 µM, and the ratios of $[S_2O_3^{2-}]:[Fe^{VI}]$ in the system were varied from 0 to 5.0 for aqueous removal of TMP (5.0 µM). The optimized ratio of $[S_2O_3^{2-}]:[Fe^{VI}]$ at 1:8

(i.e., 0.125) was used to oxidize all organic contaminants in ultrapure water or real water samples (river water and lake water). After 30 seconds of oxidation, 20.0 μL NH$_2$OH solution (1 M) was added to quench the reactions. Samples were transferred into high performance liquid chromatography (HPLC) vials, and were subsequently analyzed using the HPLC method. Similar experiments using TMP as a target contaminant were also performed by replacing Fe$^{VI}$ with Mn$^{VII}$ or chlorine under the same conditions. All experiments were carried out at room temperature, and were at least in triplicates.

To study the influence of dissolved O$_2$ on the reaction system of Fe$^{VI}$ and S$_2$O$_3^{2-}$, TMP was first selected as the representative contaminant. The reaction solutions were purged by N$_2$ gas and then transferred to the anaerobic glove box. The elimination experiments of TMP (5.0 μM) at different ratios (0-5.0) of [S$_2$O$_3^{2-}$]:[Fe$^{VI}$] were conducted at pH 8.0, and the reaction was quenched at 30 seconds using 20.0 μL NH$_2$OH solution (1 M). Further experiments were also performed for removal of six individual pollutants (APT, ATL, CAF, DCF, ENR, and TMP) at low concentration (1.0 μM) with or without N$_2$ purging of solutions.

The concentrations of organic contaminants during chemical oxidation by FeVI and/or S$_2$O$_3^{2-}$ were measured on an Ultimate 3000 Ultra high performance liquid chromatography (UHPLC) (ThermoFisher Scientific) coupled with the diode array detector. Chromatographic analysis was conducted on a RESTEK Ultra C$_{18}$ analytical column (4.6 mm×250 mm, particle size 5 μm) at 30° C. The mobile phase was 0.05% phosphoric acid in water (A) and methanol (B). The injection volume was 10.0 μL, and the other elution conditions (i.e., mobile phase compositions, flow rate and detection wavelength) are listed in Table 2.

TABLE 2

HPLC conditions of sixteen individual organic contaminants in this study.

| Micropollutants | Mobile phase Methanol/water | Flow rate (mL/min) | UV$_{max}$ (nm) | Retention time (min) |
|---|---|---|---|---|
| APT | 50:50 | 0.8 | 215 | 4.693 |
| ATL | 20:80 | 0.8 | 224 | 5.830 |
| ATZ | 70:30 | 1.0 | 222 | 6.273 |
| BZF | 70:30 | 1.0 | 228 | 8.050 |
| CAF | 50:50 | 0.8 | 273 | 4.447 |
| CMZ | 70:30 | 0.8 | 284 | 5.887 |
| DMS | 70:30 | 1.0 | 242 | 5.887 |
| DTA | 35:65 | 0.8 | 238 | 4.393 |
| DCF | 90:10 | 1.0 | 275 | 4.167 |
| ENR | 35:65 | 0.8 | 271 | 7.273 |
| FLU | 70:30 | 1.0 | 324 | 4.730 |
| IBP | 80:20 | 1.0 | 223 | 8.220 |
| DEET | 65:35 | 1.0 | 210 | 8.010 |
| PPN | 55:45 | 1.0 | 214 | 6.557 |
| SMX | 50:50 | 0.8 | 268 | 6.837 |
| TMP | 35:65 | 1.0 | 271 | 4.197 |

For the chromatographic separation of six contaminant mixtures (CMZ, DCF, ENR, PPN, SMX, and TMP), a solvent gradient method was used with flow rate of 0.8 mL/min. This method started with 35% B (0-7.5 min), followed by 35% B to 55% B (7.5-10.5 min), 55% B to 70% B (10.5-15.5 min), 70% B to 90% B (15.5-18.5 min), 90% B (18.5-25.0 min), 90% B to 35% B (25.0-25.5 min) and post-equilibration at 35% B (25.5-33.0 min).

Two inorganic reactive radicals (i.e., .OH and/or SO$_4$.$^-$), possibly produced in the oxidation system, were measured by the room-temperature electron paramagnetic resonance (EPR), which was performed at room temperature on a Bruker ELEXSYS-II E500 spectrometer (Rheinstetten, Germany) at the X-band frequency of 9.4 GHz. The reaction solutions were pre-added with DMPO (100.0 mM), and then transferred to 2 mm EPR tube for the measurements. The related operating parameters were selected: center field, 3340.0 G; sweep width, 160.0 G; sweep time, 30 seconds; attenuation, 25.0 dB; scan times, 10.

Results

Figure 1A:
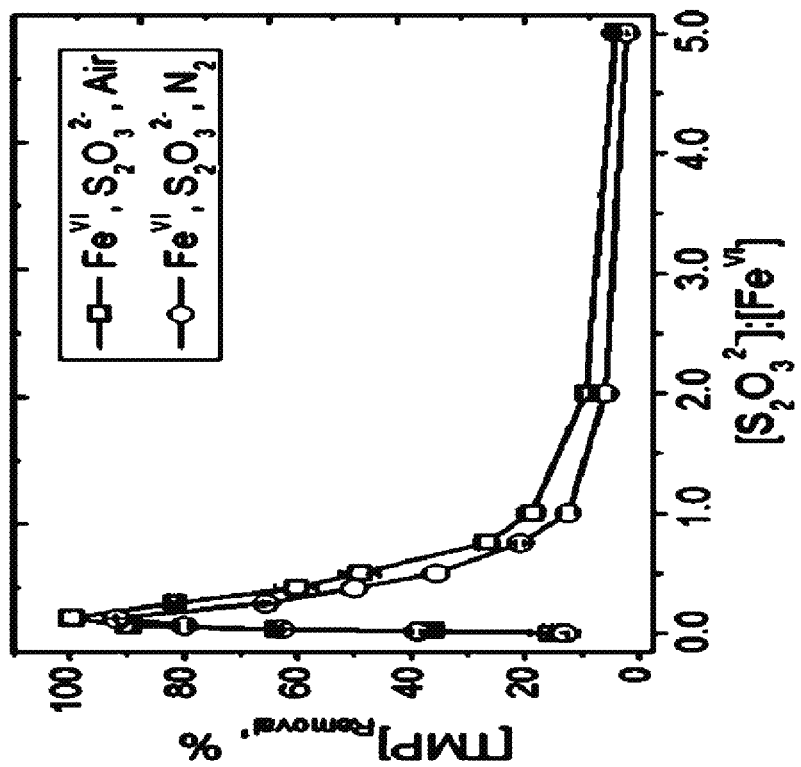
Figure 2:
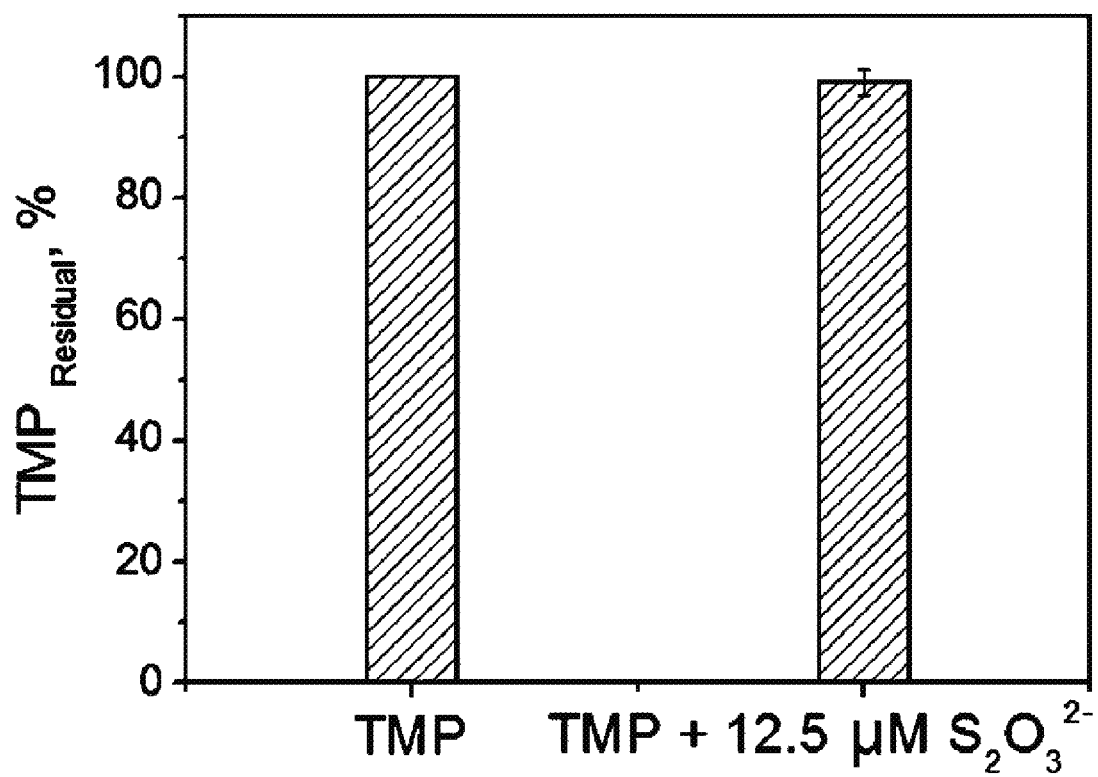
FIG. 2 shows the control experiments of trimethoprim (TMP) removal by just addition of $S_2O_3^{2-}$ and quenching reagent ($NH_2OH$).

1. The removal of TMP (5.0 μM) by Fe(VI) (100.0 μM) was investigated in oxygenated solutions as a function of molar ratio of S$_2$O$_3^{2-}$ to Fe$^{VI}$ ranging from 0 to 5.0 at pH 8.0. The reactions were quenched after 30 seconds. Without S$_2$O$_3^{2-}$, oxidation of TMP by Fe$^{VI}$ was about 16%, which increased rapidly to 100% at a molar ratio of 0.125 ([S$_2$O$_3^{2-}$]:[Fe$^{VI}$]) (FIG. 1a). When only S$_2$O$_3^{2-}$ (12.5 μM) was added into TMP-containing solution, no oxidation of TMP was seen (FIG. 2). With the increasing molar ratio from 0.125 to 1.0, a sharp decline in oxidation of TMP was observed. Further increase in the molar ratio, only about 4% elimination of TMP was found at a molar ratio of 5.0. In the experiments without oxygen in the reaction solution (for example, N$_2$ purging), a similar oxidation of TMP by Fe$^{VI}$—S$_2$O$_3^{2-}$ system was observed (FIG. 1a). This suggests that oxygen has minimum, if any, role in carrying out oxidation of TMP by Fe$^{VI}$—S$_2$O$_3^{2-}$ mixed solution in 30 seconds.

2. Oxidation of TMP was performed in air saturated mixed solution by replacing Fe$^{VI}$ with Mn$^{VII}$ and chlorine, two oxidants commonly used in treating water. Concentrations of oxidant and S$_2$O$_3^{2-}$ were kept the same as in experiments using Fe$^{VI}$ and quenching of the reactions was also in 30 seconds. Both Mn$^{VII}$ and chlorine had no enhancement due to addition of S$_2$O$_3^{2-}$, and only inhibition of oxidation of TMP was observed (FIG. 1b). No oxidation of TMP could be seen at a molar ratio of 5.0. This indicates that the use of S$_2$O$_3^{2-}$ in accelerating the oxidation of organic contaminants is limited to Fe$^{VI}$ but not to the other studied oxidants.

Figure 3:
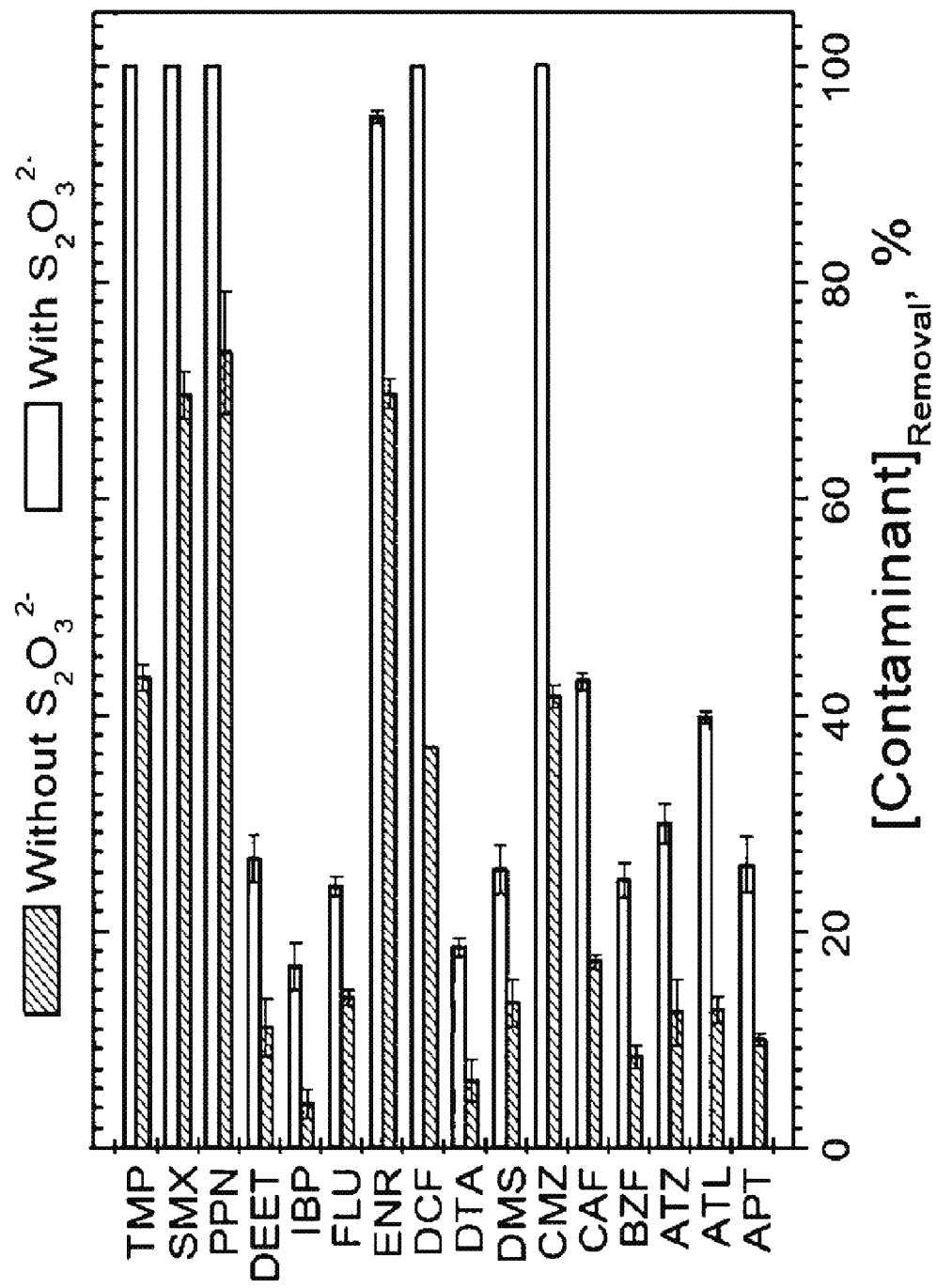
FIG. 3 compares oxidation of organic contaminants listed in Table 1 by $Fe^{VI}$ with and without $S_2O_3^{2-}$: aspartame (APT), atenolol (ATL), atrazine (ATZ), bezafibrate (BZF), caffeine (CAF), carbamazepine (CMZ), dexamethasone (DMS), diatrizoic acid (DTA), diclofenac (DCF), enrofloxacin (ENR), flumequine (FLU), ibuprofen (IBP), N,N-diethyl-3-toluamide (DEET), propranolol (PPN), sulfadimethoxine (SMX), and trimethoprim (TMP). Experimental conditions: $[Contaminant]_0$=1.0 µM, $[Fe^{VI}]_0$=100.0 µM, $[S_2O_3^{2-}]_0$=12.5 µM, pH=8.00±0.05, reaction time=30 s.
Figure 4:
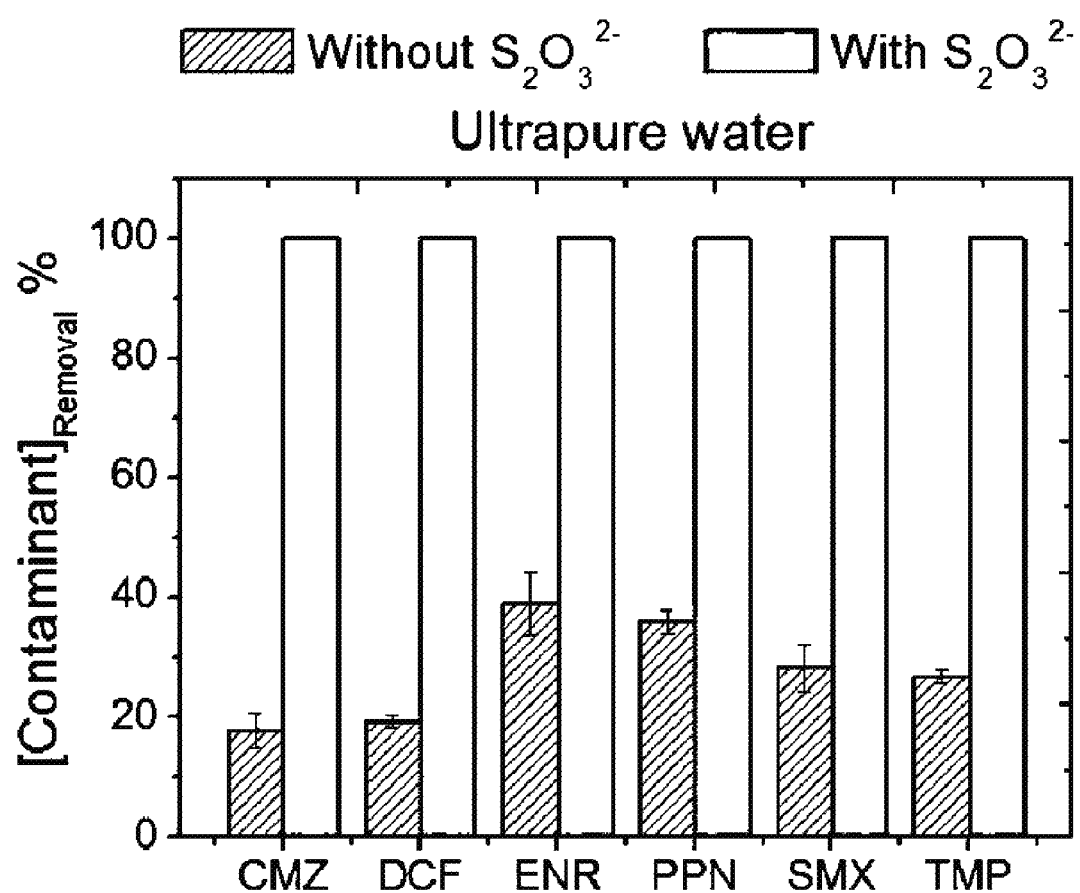
FIG. 4 shows removal of six representative contaminants in water by $Fe^{VI}$—$S_2O_3^{2-}$: carbamazepine (CMZ), diclofenac (DCF), enrofloxacin (ENR), propranolol (PPN), sulfadimethoxine (SMX), and trimethoprim (TMP). Experimental conditions: [Each contaminant]$_0$=1.0 µM, $[Fe^{VI}]_0$: [Total contaminants]=25:1, $[S_2O_3^{2-}]_0$:$[Fe^{VI}]_0$=0.125, $[Fe^{VI}]_0$=150.0 µM, $[S_2O_3^{2-}]_0$=18.75 µM, pH=8.00±0.05, reaction time=30 s.
Figure 5B:
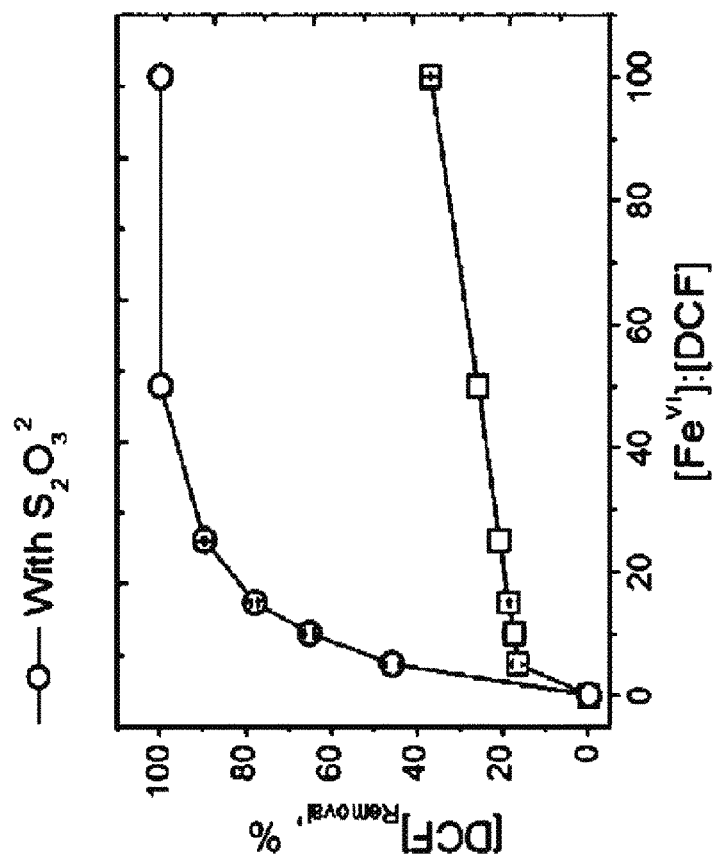
FIGS. 5A-5F show effect of molar ratios of $Fe^{VI}$ to contaminants on the removal of six representative pharmaceuticals by $Fe^{VI}$—$S_2O_3^{2-}$: carbamazepine (CMZ, FIG. 5A), diclofenac (DCF, FIG. 5B), enrofloxacin (ENR, FIG. 5C), propranolol (PPN, FIG. 5D), sulfadimethoxine (SMX, FIG. 5E), and trimethoprim (TMP, FIGURE 5F). Experimental conditions: $[Fe^{VI}]_0$=100.0 µM, $[S_2O_3^{2-}]_0$=12.5 µM, pH=8.00±0.05, reaction time=30 s.
Figure 5A:
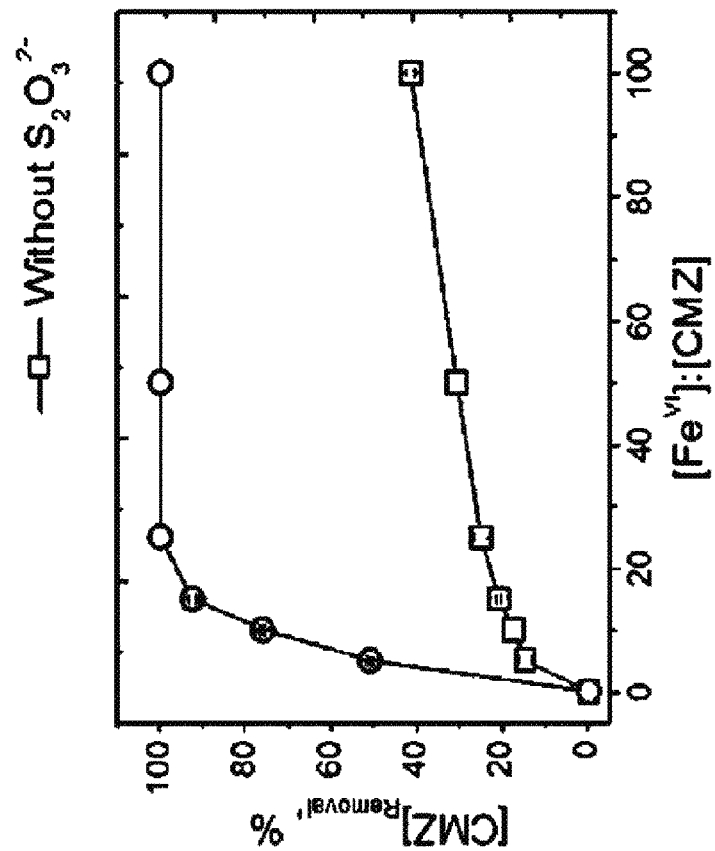
Figure 5D:
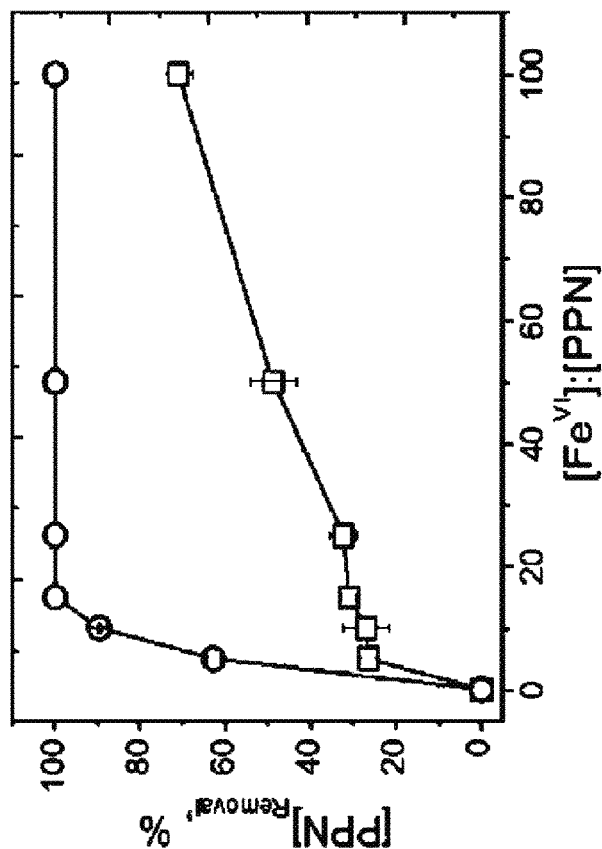
Figure 5C:
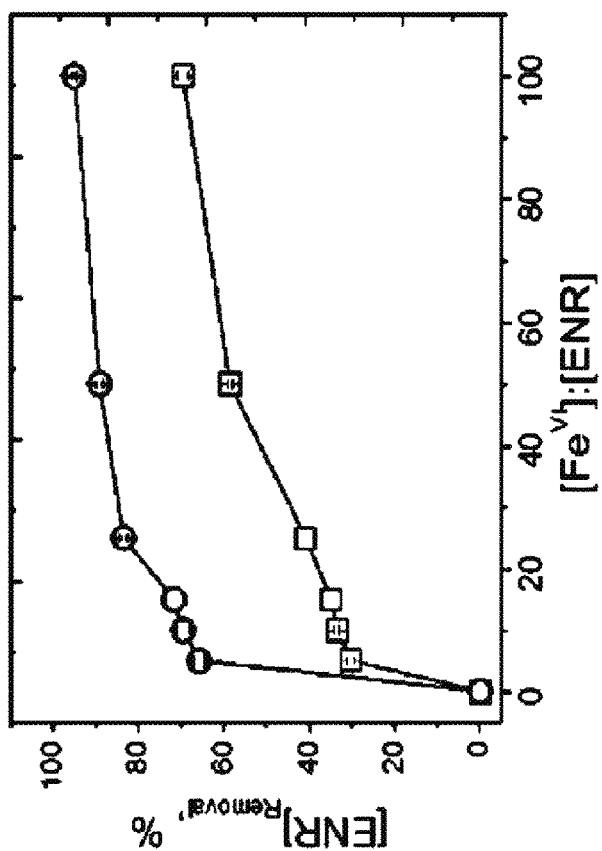
Figure 5F:
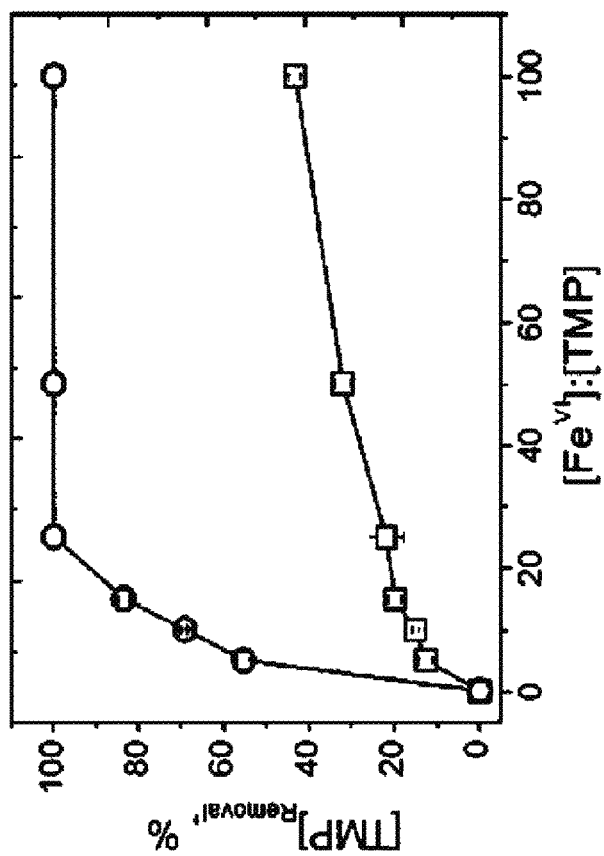
Figure 5E:
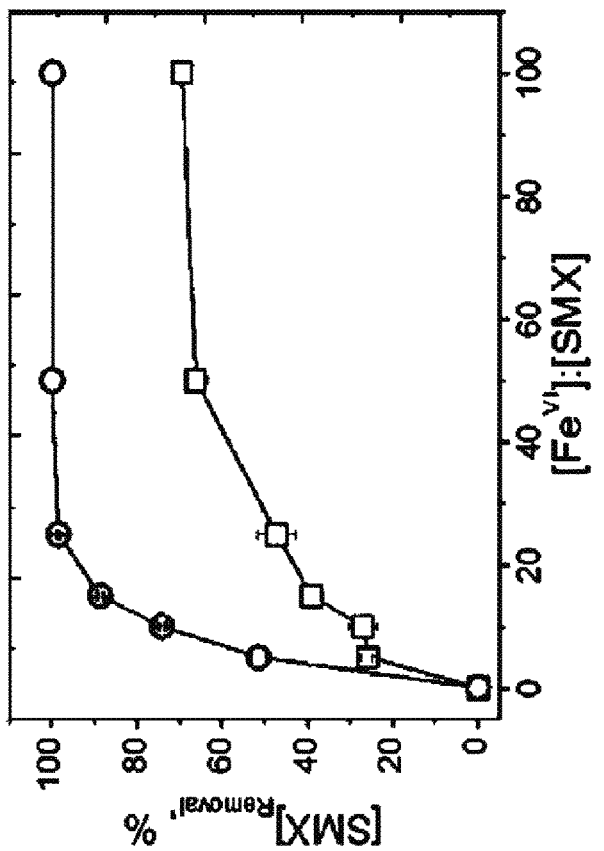

3. Acceleration of oxidation of 16 organic contaminants by Fe$^{VI}$—S$_2$O$_3^{2-}$ system was further tested. As shown in FIG. 3, the presence of S$_2$O$_3^{2-}$ with Fe$^{VI}$ could increase the oxidation of all the contaminants in 30 seconds. Almost complete removal of typical pharmaceuticals (CMZ, DCF, PPN, SMX, TMP, and ENR) were found. Results of FIG. 3 suggest that a wide range of organic contaminants are removed rapidly by the Fe$^{VI}$—S$_2$O$_3^{2-}$. Rapid elimination of these pharmaceuticals in a mixture solution by the Fe$^{VI}$—S$_2$O$_3^{2-}$ system was also obtained (FIG. 4). This further suggests the applicability of S$_2$O$_3^{2-}$ in enhancing the oxidation of organic contaminants by Fe$^{VI}$. For practical application, the lower ratios of Fe$^{VI}$ to these six contaminants were selected to further study the removal performance of this system. Compared with the partial oxidations of these compounds (25.11% for CMZ, 20.85% for DCF, 41.02% for ENR, 32.46% for PPN, 47.27% for SMX and 22.04% for TMP) at a low ratio of 25:1 for [Fe$^{VI}$]:[contaminants] without S$_2$O$_3^{2-}$, almost complete removal was noted for six test pharmaceuticals after 30 seconds in the presence of S$_2$O$_3^{2-}$ (FIG. 5).

Figures 6A, 6B:
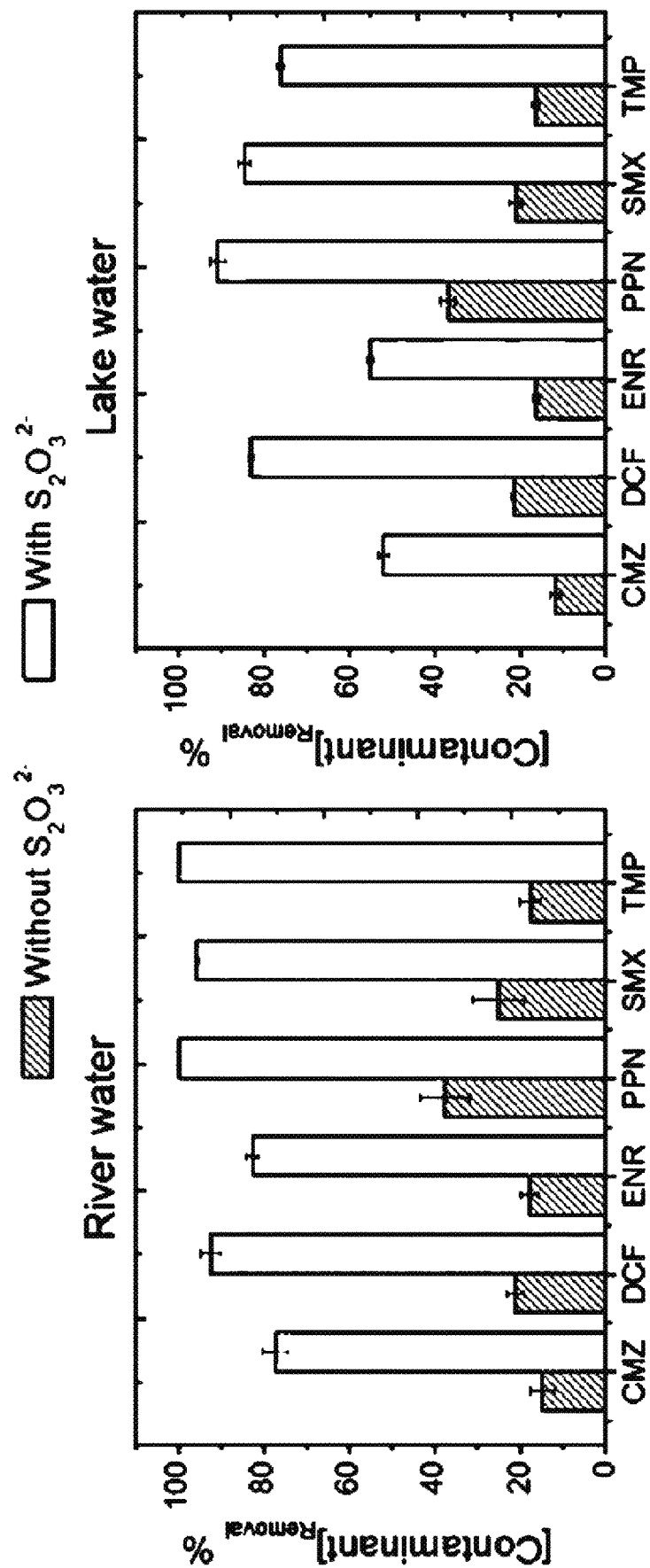
FIG. 6 demonstrates elimination of six pharmaceutical contaminants by $Fe^{VI}$—$S_2O_3^{2-}$ in real water samples obtained from Brazos River, Texas (FIG. 6A) and Lake Bryan, Texas (FIG. 6B). The contaminants are: carbamazepine (CMZ), diclofenac (DCF), enrofloxacin (ENR), propranolol (PPN), sulfadimethoxine (SMX), and trimethoprim (TMP). Experimental conditions: [Each contaminant]$_0$ in mixture of samples=1.0 µM, $[Fe^{VI}]_0$: [Total contaminants]=25:1, $[S_2O_3^{2-}]_0$:$[Fe^{VI}]_0$=0.125, $[Fe^{VI}]_0$=150.0 µM, $[S_2O_3^{2-}]_0$=18.75 µM, pH=8.00±0.05, reaction time=30 s).

Considering the co-existence of various organic contaminants in the aquatic environment, the newly developed Fe$^{VI}$—S$_2$O$_3^{2-}$ process was tested to eliminate six pharmaceuticals (CMZ, DCF, ENR, PPN, SMX and TMP) in different water matrices. A optimum molar ratio of 0.125 ([S$_2$O$_3^{2-}$]:[Fe$^{VI}$]) at pH 8.0 was used to remove pharmaceuticals in both river water and lake water, and the reactions were quenched in 30 seconds. The removal results are depicted in FIG. 5. Significantly, S$_2$O$_3^{2-}$ could enhance the removal percentages of target pharmaceuticals present in river water and lake water by $Fe^{VI}$. In river water, four of the six pharmaceuticals could be removed completely (FIG. 6a). Removal of CMZ and ENR was about 80%. In lake water, removal of pharmaceuticals was less than that in river water (FIG. 6b). Eliminations of DCF, PPN, SMX, and TMP were about 80%, while removal of CMZ and ENR was about 50%. It is likely that water constituents in natural waters such as anions, cations, and dissolved organic matters are influencing the removal of the target contaminants by the oxidizing species present in mixture of $Fe^{VI}$ and $S_2O_3^{2-}$ solution. These results demonstrated that $Fe^{VI}$—$S_2O_3^{2-}$ oxidation can be adopted as an efficient and rapid remediation of natural waters.

A series of reactions that may take place when $S_2O_3^{2-}$ is added to a solution of $Fe^{VI}$ and contaminant. Reactions (1)-(6) result in high-valent iron species ($Fe^V$), sulfur-centered radicals ($S_2O_3\cdot^-$, $S_4O_6\cdot^{3-}$, $.SO_3^-$, $.SO_4^-$) and .OH, which can possibly oxidize contaminants (Reaction 7).

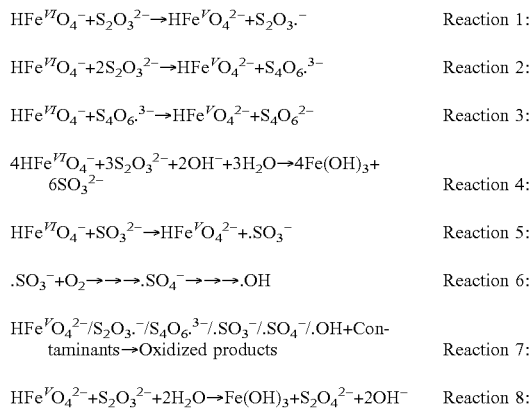

Figure 7:
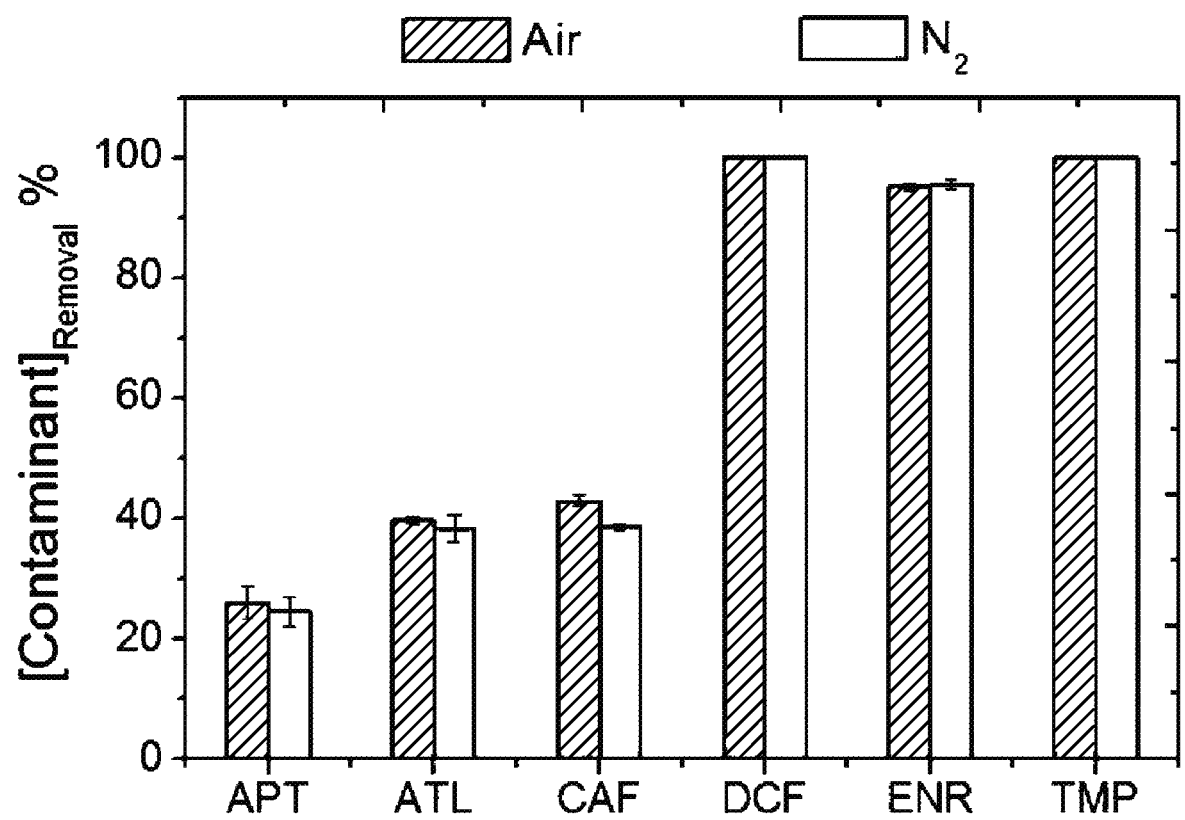
FIG. 7 Removal of six representative contaminants by $Fe^{VI}$—$S_2O_3^{2-}$ under air or nitrogen conditions: aspartame (APT), atenolol (ATL), caffeine (CAF), diclofenac (DCF), enrofloxacin (ENR), and trimethoprim (TMP). Experimental conditions: $[Contaminant]_0$=1.0 µM, $[Fe^{VI}]_0$=100.0 µM, $[S_2O_3^{2-}]_0$=12.5 µM, pH=8.00±0.05, reaction time=30 s.
Figure 8:
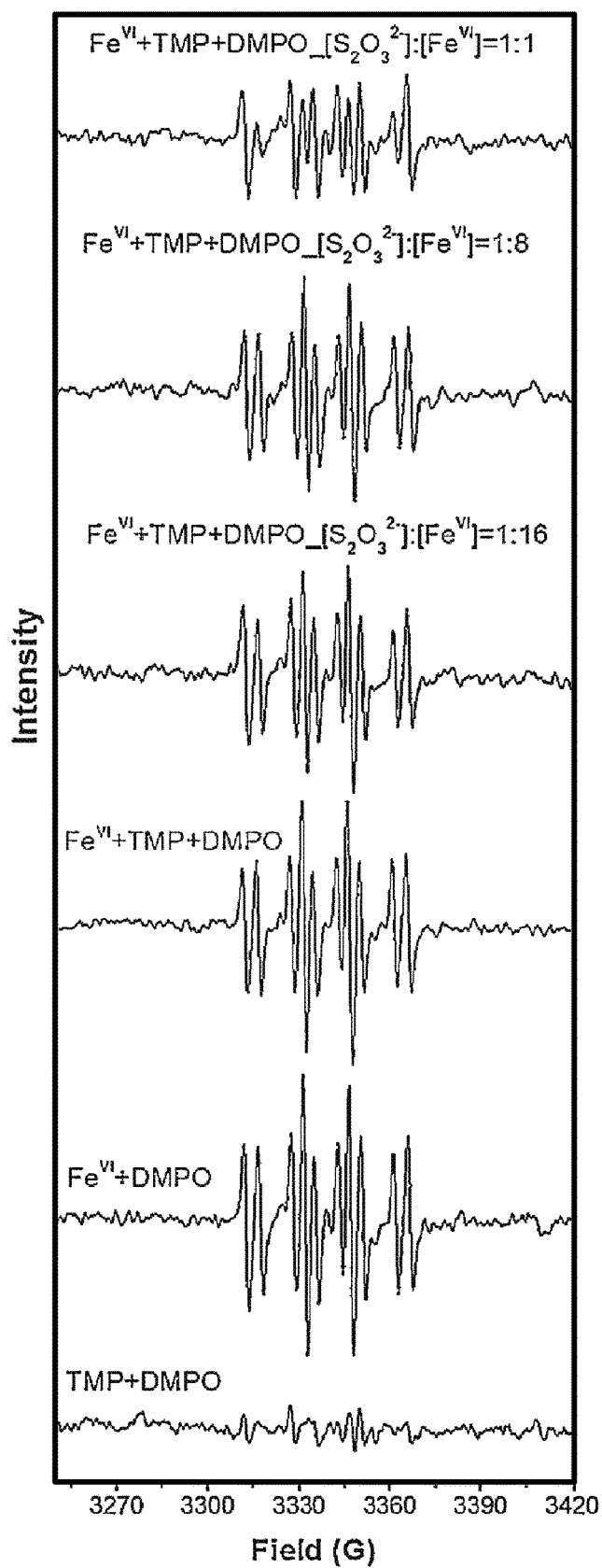
FIG. 8 shows EPR spectra of the reaction solutions obtained by different treatments, as shown. Experimental conditions: $[TMP]_0$=5.0 µM, $[Fe^{VI}]_0$=100.0 µM, $[S_2O_3^{2-}]$:$[Fe^{VI}]$=0, 1:16, 1:8 and 1:1, [DMPO]=100.0 mM, pH=8.0. The g values for each signal (left to right) were 2.0225, 2.0196, 2.01315, 2.01055, 2.00847, 2.00368, 2.00162, 1.99929, 1.99275, and 1.99003.

$HFe^{VI}O_4^- + S_2O_3^{2-} \rightarrow HFe^{V}O_4^{2-} + S_2O_3\cdot^-$   Reaction 1:

$HFe^{VI}O_4^- + 2S_2O_3^{2-} \rightarrow HFe^{V}O_4^{2-} + S_4O_6\cdot^{3-}$   Reaction 2:

$HFe^{VI}O_4^- + S_4O_6\cdot^{3-} \rightarrow HFe^{V}O_4^{2-} + S_4O_6^{2-}$   Reaction 3:

$4HFe^{VI}O_4^- + 3S_2O_3^{2-} + 2OH^- + 3H_2O \rightarrow 4Fe(OH)_3 + 6SO_3^{2-}$   Reaction 4:

$HFe^{VI}O_4^- + SO_3^{2-} \rightarrow HFe^{V}O_4^{2-} + .SO_3^-$   Reaction 5:

$.SO_3^- + O_2 \rightarrow \rightarrow \rightarrow .SO_4^- \rightarrow \rightarrow \rightarrow .OH$   Reaction 6:

$HFe^{V}O_4^{2-}/S_2O_3\cdot^-/S_4O_6\cdot^{3-}/.SO_3^-/.SO_4^-/.OH + \text{Contaminants} \rightarrow \text{Oxidized products}$   Reaction 7:

$HFe^{V}O_4^{2-} + S_2O_3^{2-} + 2H_2O \rightarrow Fe(OH)_3 + S_2O_4^{2-} + 2OH^-$   Reaction 8:

Among the radicals, $.SO_4^-$ and .OH radicals could be generated through oxygen (see reaction 6), which are the stronger oxidants than the other radicals such as ($E^0(SO_4\cdot^-/SO_4^{2-})$=2.43 V and $E^0(.OH/OH^-)$=2.80 V versus $E^0(S_2O_3\cdot^-/S_2O_3^{2-})$=1.35 V; $E^0(S_4O_6\cdot^{3-}/S_4O_6^{2-})$=1.06 V; $E^0(SO_3\cdot^-/SO_3^{2-})$=0.73 V). Participation of $.SO_4^-$ and .OH radicals was initially explored by performing experiments under nitrogen environment (i.e., no oxygen from air). The results did not show any significant difference in enhancing the oxidation of TMP by $Fe^{VI}$—$S_2O_3^{2-}$ (FIG. 1a). Similar results were also observed in oxidizing other organic contaminants (i.e., no obvious difference with and without oxygen in oxidation of APT, ATL, CAF, DCF, and ENR, FIG. 7). This finding suggests that there is no role of $.SO_4^-$ and .OH in oxidation of TMP by $Fe^{VI}$—$S_2O_3^{2-}$. This finding was further confirmed by the room-temperature electron paramagnetic resonance (EPR) measurement with 5,5-dimethyl-1-pyrroline-N-oxide (DMPO) as the spin trap reagent. Compared with the EPR spectrum of $Fe^{VI}$ and DMPO system, no new signal was observed after introducing $S_2O_3^{2-}$ into the reaction system (FIG. 8). This indicates that .OH and/or $SO_4\cdot^-$ were not produced using $Fe^{VI}/S_2O_3^{2-}$, and therefore not contributing to the enhanced oxidation of organic contaminants. Other radicals, $S_2O_3\cdot^-$, $S_4O_6\cdot^{3-}$, and $SO_3\cdot^-$, seem to be mild oxidants and may not be responsible for enhancing effect of $S_2O_3^{2-}$ in the oxidation of contaminants by $Fe^{VI}$.

Figure 9:
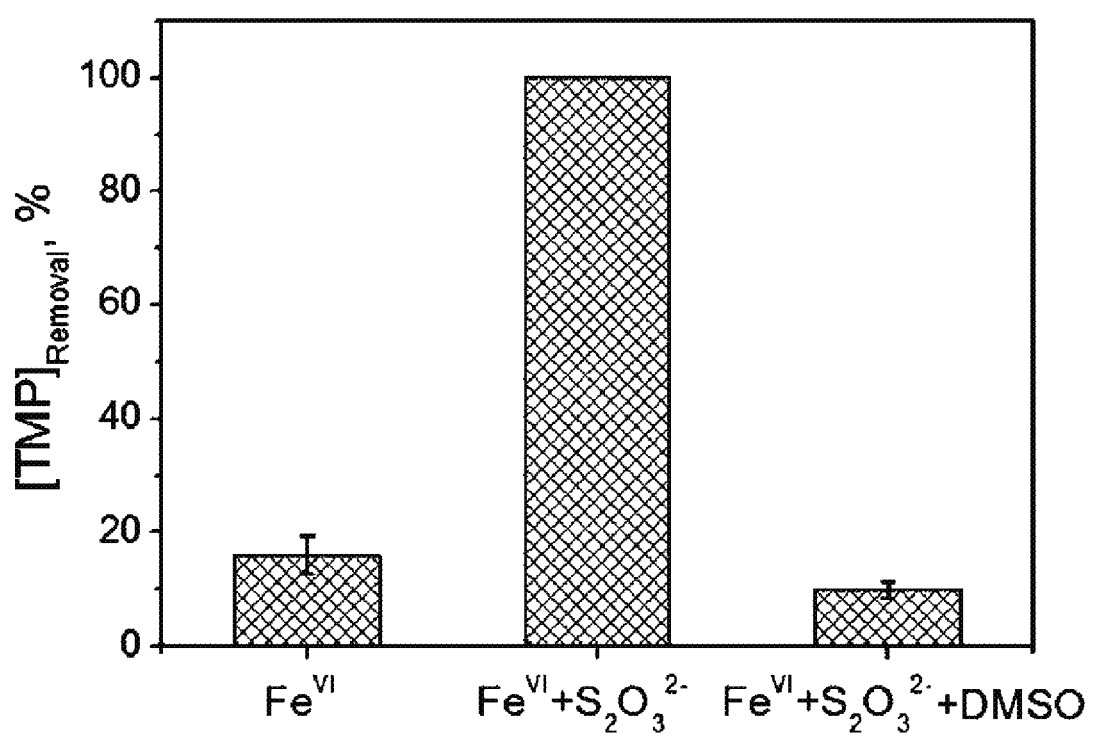
FIG. 9 compares trimethoprim (TMP) removal after different $Fe^{VI}$ treatments without and with the additions of $S_2O_3^{2-}$ and/or DMSO. Experimental conditions.

$Fe^V$ has shown high reactivity with second-order rate constants of the reactions of $Fe^V$ with contaminants, which are three-four orders of magnitude higher than those of $Fe^{VI}$. The role of $Fe^V$ on the $Fe^{VI}$—$S_2O_3^{2-}$-contaminant was explored by using dimethyl sulfoxide (DMSO) as the probing reagent for the high-valent iron species. DMSO is selectively oxidized by $Fe^V$=O and $Fe^{IV}$=O species through oxygen atom transfer to produce corresponding sulfone. Such reactions are different from the reaction pathways involved in radicals-based oxidation processes. To test the possibility of intermediate $Fe^V$ and $Fe^{IV}$ species in $Fe^{VI}$—$S_2O_3^{2-}$-TMP system, oxidation of TMP was followed by adding 1 mM DMSO in this system. Interestingly, oxidation of TMP was almost inhibited in the presence of DMSO (i.e., no difference with and without $S_2O_3^{2-}$ in decrease of TMP concentration by $Fe^{VI}$) (FIG. 9). This suggests that $Fe^V$ and $Fe^{IV}$ species, generated in the $Fe^{VI}$—$S_2O_3^{2-}$-TMP solution were captured by DMSO and were not available to oxidize TMP. It should be pointed out that $Fe^{VI}$ has very slow reactivity with DMSO (k is about 1 $M^{-1}$ $s^{-1}$ at pH 8.0) and no significant removal of $Fe^{VI}$ by DMSO was expected in 30 seconds of the study ($t_{1/2}$ is about 690 seconds). Because the reactivity of $Fe^{IV}$ is about two-orders less than $Fe^V$, the acceleration of the oxidation of organic contaminants by $Fe^{VI}$—$S_2O_3^{2-}$ in the study was mainly caused by the $Fe^V$ species. At high concentrations of $S_2O_3^{2-}$, $Fe^V$ preferentially reacted with $S_2O_3^{2-}$ (Reaction 8). This reaction caused the inhibition of enhancement with increasing molar ratio to $S_2O_3^{2-}$ to $Fe^{VI}$ (see FIG. 1a). The inventors demonstrated hereby the establishment of $Fe^{VI}$—$S_2O_3^{2-}$ as a highly effective tool for rapidly removing a wide range of organic contaminants in water. This can be seen in real water matrices and provides a high potential for the application of $Fe^{VI}$—$S_2O_3^{2-}$ for rapid water depollution in contaminated water and wastewater treatment.

Preparation of Liquid Activated Ferrate Solution for Disinfection of Test Organism.

Activated ferrate was prepared by two approaches: (i) Solid intermediate was added directly added into tap water in which activating agents, e.g., ions that were present created the required conditions to activate ferrate, and (ii) Solid potassium ferrate(VI) was added into distilled water and sodium bicarbonate was added to activate ferrate. Addition of sodium bicarbonate to activate ferrate has not been previously described. To test liquid ferrate solutions for disinfection potential the inventors prepared stock solution of methicillin-resistant *Staphylococcus aureus*, *Clostridium difficile* spores and *Escherichia coli* in a concentration of $10^6$ using in one approach the tap water and in a second approach using distilled sterile water. Then ferrate was added to the solution in both cases. For the second approach sodium bicarbonate was added to activate the ferrate. In a third approach lake water (Belton, TX) was tested for disinfection using ferrate intermediate and sodium bicarbonate.

Test Organism Preparation.

Test organism's methicillin-resistant *Staphylococcus aureus*, *Clostridium difficile* spores and *Escherichia coli* were prepared in one approach in tap water to achieve a concentration of at least $10^6$ using a calibrated McFarland meter with color range of red and confirming actual colony counts using serial dilution and plating. In another approach the same test organisms were prepared using distilled sterile water with same concentration. In a third approach natural occurring lake water with unknown contaminant was used for testing. The results are as summarized below.

Results:

Summary:

First approach: After making the test organism in tap water to achieve a minimum concentration of $10^6$, solid ferrate intermediate was added to the solution for varying contact times of 1-5 minutes. Low concentration of acetic acid was used to stop the reaction at the end of the contact time. The colonies were plated on blood agar and special media for *Clostridium difficile* and incubated for 24-48 hours. A $10^6$-log reduction for bacteria, and $10^3$-log reduction for spores was achieved in 1 minute.

Second approach: After making the test organism in distilled sterile water to achieve a minimum concentration of $10^6$ as described above, solid ferrate intermediate and thoroughly mixed. Then sodium bicarbonate was added to the solution (to activate ferrate) with varying contact times of 1-5 minutes. Low concentration of acetic acid was used to stop the reaction at the end of the contact time. The colonies were plated on blood agar and special media for *Clostridium difficile* and incubated for 24-48 hours. A $10^6$-log reduction for bacteria, and $10^3$-log reduction for spores was achieved in 1 minute.

Third approach: Natural occurring lake water with naturally occurring bacterial contamination from Lake Belton was tested for disinfection using ferrate. Ferrate was added to lake water along with sodium bicarbonate was added to activate ferrate. After a one-minute contact time the reaction was stopped using acetic acid. The solution was plated onto blood agar plates and incubated for 24-48 hours. Complete elimination was seen on treated water as compared to untreated controlled with an expected log reduction of at least $10^3$.

All of the above experiments prove that the new activation method for ferrate is effective on bacteria and spores in natural occurring water as well as potable water whether it is treated or untreated.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An aqueous ferrate solution, consisting essentially of a ferrate and a thiosulfate in water, wherein the ratio of thiosulfate concentration to ferrate concentration is from about 1:4 to about 1:16.

2. The aqueous ferrate solution of claim 1, wherein the concentration of the ferrate is from about 0.001 wt % to about 5.0 wt % based on the total weight of the solution.

3. The aqueous ferrate solution of claim 1, wherein the thiosulfate is sodium thiosulfate.

4. The aqueous ferrate solution of claim 1 further comprising a disinfectant selected from sodium hypochlorite, chloramine, a quaternary alkylamine, and combinations thereof.

5. The aqueous ferrate solution of claim 4, wherein the disinfectant is sodium hypochlorite present in a concentration from about 0.001 wt % to about 5.0 wt % based on the total weight of the solution.

6. The aqueous ferrate solution of claim 1, further comprising one or more surfactants.

7. The aqueous ferrate solution of claim 1, wherein the aqueous ferrate solution has a pH from about 5.0 to about 12.

8. The aqueous ferrate solution of claim 1, wherein the solution is stable for a period of at least a week.

9. The ferrate solution of claim 1, wherein the ratio of thiosulfate concentration to ferrate concentration in the aqueous solution is 1:16.

10. The ferrate solution of claim 1, wherein the ratio of thiosulfate concentration to ferrate concentration in the aqueous solution is 1:8.

11. The ferrate solution of claim 1, wherein the ratio of thiosulfate concentration to ferrate concentration in the aqueous solution is 1:4.

12. An aqueous ferrate solution, consisting essentially of a ferrate, a thiosulfate, and a disinfectant in water, wherein the disinfectant selected from sodium hypochlorite, chloramine, a quaternary alkylamine, and combinations thereof, and wherein the ratio of thiosulfate concentration to ferrate concentration is from about 1:4 to about 1:16.

13. The aqueous ferrate solution of claim 12, wherein the concentration of the ferrate is from about 0.001 wt % to about 5.0 wt % based on the total weight of the solution.

14. The aqueous ferrate solution of claim 12, wherein the thiosulfate is sodium thiosulfate.

15. The aqueous ferrate solution of claim 12, wherein the disinfectant is sodium hypochlorite present in a concentration from about 0.001 wt % to about 5.0 wt % based on the total weight of the solution.

16. The aqueous ferrate solution of claim 12, further comprising one or more surfactants.

17. The aqueous ferrate solution of claim 12, wherein the aqueous ferrate solution has a pH from about 8.0 to about 10.

18. The ferrate solution of claim 12, wherein the ratio thiosulfate concentration to ferrate concentration in the aqueous solution is 1:16.

19. The ferrate solution of claim 12, wherein the ratio thiosulfate concentration to ferrate concentration in the aqueous solution is 1:8.

20. The ferrate solution of claim 1, wherein the solution has a pH from about 8 to about 10.5.

21. The ferrate solution of claim 12, wherein the solution has a pH from about 8 to about 10.5.

* * * * *